Jan. 29, 1946.    J. A. COMPTON ET AL    2,393,589
RELIEF VALVE
Filed Oct. 9, 1943
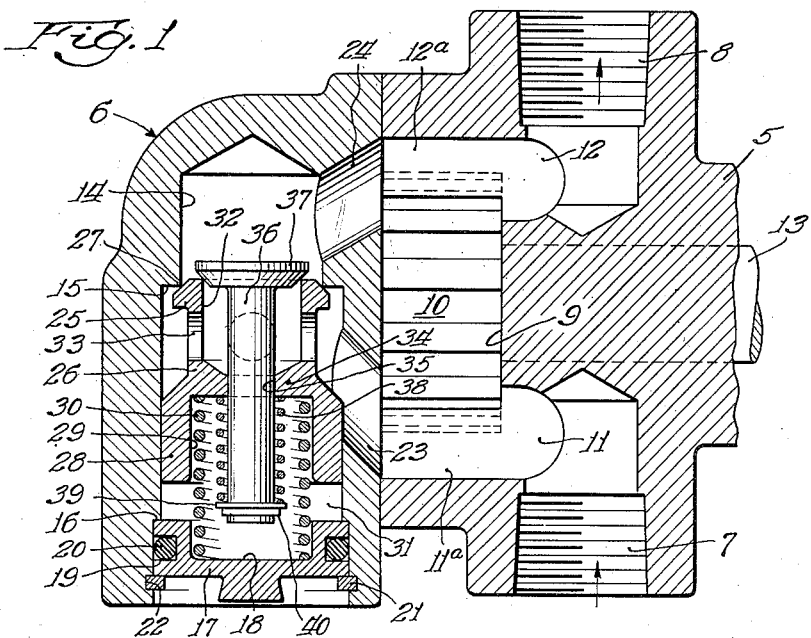
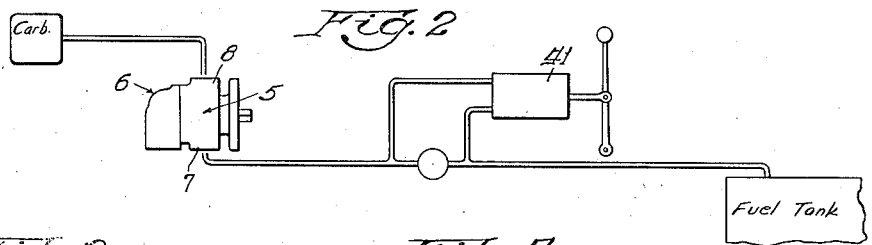
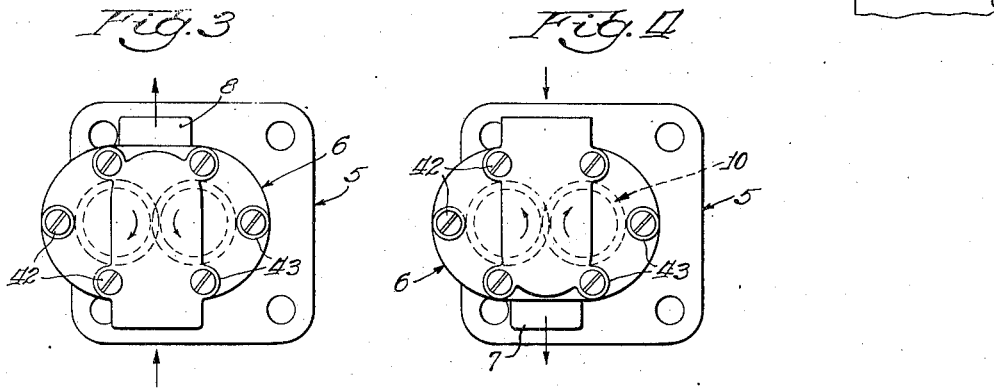
Inventors:
James A. Compton
Norbert W. Horn
By Edward C. Gritzbaugh
Atty.

Patented Jan. 29, 1946

2,393,589

UNITED STATES PATENT OFFICE 2,393,589

RELIEF VALVE

James A. Compton, South Euclid, and Norbert W. Horn, Cleveland, Ohio, assignors to Pesco Products Co., Cleveland, Ohio, a corporation of Ohio Application October 9, 1943, Serial No. 505,606

2 Claims. (Cl. 277—45)

The present invention relates to relief valves, and more particularly to a valve of this type that is adapted for use in connection with a fuel pump.

It is the principal object of this invention to simplify the construction of a relief valve such as contemplated herein, and to improve the efficiency and operation of such valve.

One of the aims of the present invention is to provide a comparatively small and inexpensive fuel pump relief valve that has many uses but is especially adapted for use for small aircraft. In this connection the invention contemplates the provision of a bypass with dual acting control valves for shunting the fluid in either direction around the pump. One of said valves acts as a relief valve to be opened whenever there is abnormal pressure at the discharge or compression side of the pump and thereby return the fluid to the suction side of the pump; the other or second of said valves is interposed as a fluid shunt to pass the fluid around the relief valve and it is adapted to operate during a cessation of the mechanical pump, when an emergency hand-operated pump is employed to force the fluid from the supply reservoir around the relief valve and the mechanical pump, and thereby feed the fuel to the engine carburetor or other structure where the fluid is to be utilized.

It is an object of the present invention to provide a relief valve assembly that is adapted to be inverted on the pump housing to permit the same to function in the event the operation of the pump is reversed.

Another object of this invention is to provide a relief valve wherein the springs or other means for seating the valve elements are housed in a dash-pot that is non-communicating with the valve passages so that the springs will not interfere with the flow of the fluid through the valve passages. This, for one thing, allows greater latitude in spring design since the springs may be constructed without considering whether the spaces between the coils thereof are of such dimensions as to restrict the flow of fuel.

A further object is to provide a relatively large dash-pot plunger, and to form one of the valve heads integral therewith.

It is also an object of this invention to provide a secondary valve that is carried by the plunger and is guided therein, while at the same time it is adapted for bodily movement independent of the plunger and relief valve. This secondary valve has its head seated in the relief valve head which is integral with the plunger.

The arrangements above mentioned have several advantages in that they permit the incorporation of the structure in a very small casing, and the plunger, in addition to performing the function of damping out fluctuations of its integral relief valve, also acts as a guide and support for both the valves that are contemplated herein. Also, the use of a relatively large dash-pot plunger of hollow form permits the employment of a coiled valve seating spring therein that has a wide diameter and therefore is not inclined to buckle or distort sidewise and tend to alter the normal expansive pressure thereof.

Additional objects, aims and advantages of the present invention will be apparent to persons skilled in the art after the construction and operation of the relief valve is understood from the within description.

It is preferred to accomplish the numerous objects of this invention and to practice the same in substantially the manner hereinafter fully described and as more particularly pointed out in the appended claims, reference being made to the accompanying drawing that forms a part of this specification:

Fig. 1 is a vertical section taken through the pump housing and valve casing on the plane of the axes of the valves and disclosing the instrumentalities for practicing the invention contemplated herein;

Fig. 2 is a diagram illustrative of a manner of use of this invention; and

Figs. 3 and 4 are side elevations of the pump housing and valve casing to illustrate the reversibility of the casing to accommodate the same for a reverse operation of the pump.

The drawing is to be understood as being more or less of a schematic character for the purpose of disclosing a typical or preferred form of the improvements contemplated herein, and for the purpose of clearness Fig. 1 is made on enlarged scale.

The structure illustrated embodies a pump housing 5 having an open side that is closed by a cover 6 which also provides the valve casing. These parts 5 and 6 have plane or flat proximate faces and are suitably secured together to provide an assembled unitary structure that is adapted to be readily interposed in a liquid fuel supply line that usually leads from a tank or reservoir to the carburetor for an internal combustion engine.

The pump housing 5 is provided with inlet and outlet stubs 7 and 8 respectively, and an intermediate chamber 9 in which the pump 10 of the meshed gear type is operatively disposed. The suction side of the pump communicates with the inlet stub 7 by a short passageway 11, and the pressure side of the pump discharges the liquid fuel under pressure through a short passageway 12 to the outlet stub 8. The pump may be actuated by means of any suitable prime mover (not shown) that is operatively connected to the trunnion 13 of one of the compression members of the pump. It will be seen that the passageways 11 and 12 have continuing portions 11a and 12a extending across and through the pump chamber 9 and both continuing portions are open through the flat face of the housing 5. These continuations 11a and 12a form portions of a bypass fluid circuit in which the relief valve and the secondary or reverse flow valve structures are interposed as will later appear herein.

The cover member or valve casing 6 is provided with a bore 14 that is open at its bottom and terminates within the casing near the top thereof. The bore is increased in diameter a suitable distance from its upper end to provide a shoulder 15, and near the bottom of the bore there is another enlargement which forms a second shoulder 16. Adjacent its lower end the bore is tightly closed and sealed by means of the valve spring retainer 17 that has a concave central depression 18 and which also has an annular groove 19 cut inwardly in its edge to receive a seal ring 20. The upper annular margin of the retainer 17 is engaged with the shoulder 16 and said retainer is securely maintained in position by means of a snap ring 21 that is inserted in an annular groove 22 in the adjacent face of the bore and projects inwardly under the edge of the retainer. The wall of the casing 6 which is disposed next the pump housing 5, is provided with slanting passageways 23 and 24 that establish communication between the respective passageways 11a and 12a, thus forming a fluid circuit through bore 14 in the casing 6 for bypassing the fluid around the pump elements.

The fluid circuit or bypass just mentioned is valve controlled, and permits passage of the fluid in either direction within the limits of the valve regulation. In the event an abnormal pressure is created in the discharge line leading from the pump a relatively large relief valve in the bore of the casing 6 is adapted to be opened to permit the fluid to flow through passageways 12a and 24 into the bore 14 and return to the pump chamber 9 through the passages 23 and 11a.

The relief valve embodies an annular valve head 25 projecting laterally from the upper end of an irregular shaped body or stem 26. The upper corner of the valve head 25 is chamfered to engage with the counterpart chamfered corner or valve seat 27 on the inner edge of the shoulder 15 of the bore 14. The lower portion of the valve stem has an increased diameter to provide a relatively large plunger 28 of cylindrical shape that has a sufficient outside diameter to slidingly fit the portion of the casing bore that is between the shoulders 15 and 16, and said bore 14 thereby providing the guiding means for the valve 25 and the plunger end 28 of the stem.

This plunger portion 28 of the valve stem has a deep recess 29 that opens through its lower end, and in order to urge the valve 25 against its seat 27 a wide coiled spring 30 is disposed with one end engaged with the inner end of the recess 29 and its other end seated in the bottom of the depression 18 of the retainer 17. This arrangement permits the use of a spring 30 of relatively large diameter which does not tend to buckle or become distorted under tension, and it will be noted that by reason of this novel arrangement the spring 30 is not disposed in the fuel flowing through the fluid circuit or bypass so that said spring does not in any manner interfere with or influence the flow of the fluid through the bypass portion of the structure. The spring, however, is of a calculated tension in order that the valve 25 will be opened under predetermined pressure of the fluid. The space between the widened portion 28 of the valve stem and the retainer 17 provides a dash-pot 31 in which the said widened portion 28 performs the function of a plunger or piston to damp out any fluctuations of the valve 25 which is integral with said plunger.

Above its widened plunger portion 28 the valve stem is provided with a second or upper bore 32 that opens through the valve head portions 25, and a plurality of radial apertures 33 are made in the stem to afford communication between the upper bore 32 and the space between the narrow neck portion 26 of the stem and the bore of the casing beneath the shoulder 15. This provides a fluid shunt in a reverse direction around the relief valve and controlled by a smaller valve. Between the bores 29 and 32 of the combined valve stem and plunger 26—28 there is a transverse dividing wall or partition 34 that has a central aperture 35 in which the elongate stem 36 of a second or shunt control valve 37 is guided. The chamfered work-face of this valve 37 seats against the corner formed at the upper end of the bore 32 in the upper portion of the bypass control valve structure hereinbefore described. This valve 37 closes the fluid shunt and it is maintained upon its seat by means of a coiled spring 38 surrounding the lower portion of the stem 36, with its upper end bearing against the inner end of the bore 29 of the plunger 28. The other or lower end of this spring 38 engages a retainer washer 39 at the lower end of the stem 36 that is held in place by a snap ring 40.

In the event the pump 10 accidentally becomes inoperative, the liquid fuel for the carburetor may be manually forced through the fluid circuit to the carburetor. This is readily accomplished by interposing a hand pump 41 in the fuel feed line between the reservoir and the inlet stub 7 of pump housing. The pressure created by this hand pump 41, (which is independent of the mechanical pump pressure), forces the fuel into the passageways 11a and 23 of the bypass and through the ports 33 into the upper bore 32 of the large valve. This pressure will lift the small valve 37 from its seat permitting the fuel to be shunted around the relief valve and flow into the upper bore 14 of the valve casing 6, and thence through passageways 24 and 12a of the bypass and be discharged through the outlet stub 8 into the feed line leading to the carburetor. In view of the fact that the pressure from the hand pump 41 will be exerted against the back of the large valve 25 it will not unseat said valve while the fluid is passing through the shunt, and since the spring 38 for the shunt control valve 37 is enclosed in the dash-pot chamber it does not interfere with the flow of the fluid that is forced through the shunt and bypass by means of the manually operated pump 41 nor will it effect the flow of the fluid in the reversed direction when the relief valve is opened.

As shown in Figs. 3 and 4, the position of the valve casing is adapted for inverted disposition relative to the pump housing when the pump is operated in a reversed direction. This is readily accomplished by removal of the securing bolts 42 that pass through off-set lugs 43 and screw into the wall of the housing. The valve casing 6 may then be rotated 180° and the bolts replaced. This will aline passageway 24 of the casing with the passageway 11a of the pump housing and the other casing passageway 23 will be alined with the housing passageway 12a, it being understood that during the reverse operation of the pump the inlet and outlet ports will function in an opposite manner.

While this invention has been described in detail in its present preferred form or embodiment, it will be obvious to those skilled in the art, after understanding the improvements, that various changes and modifications may be made therein without departing from the spirit or scope thereof. It is aimed in the appended claims to cover all such changes and modifications.

We claim:

1. In a pressure relief and by-pass valve unit including means defining a housing having a cylindrical bore therein open at one terminal thereof, said bore having a reduced cross-section inner portion joining with a second enlarged bore portion forming a valve seat facing in the direction of said open terminal, a first port in the wall of said housing communicating with said reduced bore portion on the inner side of said valve seat and a second port in said housing communicating with said valve seat on the other side thereof, a pressure relief valve assembly for cooperation with said valve seat comprising a tubular member having a piston-like skirt reciprocably received in said enlarged bore portion in axially spaced relation to said valve seat and a reduced tubular portion terminating in a generally conical shaped valve proper engageable with said seat, a second valve seat formed in the inner terminal of said reduced tubular portion and facing in the direction opposite to that in which said first valve seat faces, radial port defining means in the wall of said reduced tubular portion for placing the interior thereof in communication with said second housing port, a by-pass valve engageable with said second seat, a transverse partition in said tubular member formed with an axially extending cylindrical bore, a cylindrical valve stem extending from the back side of said second valve and passing through said cylindrical opening in said partition, a relatively weak coil compression spring embracing said stem and interposed between said partition and the outer terminal of said stem normally urging said second by-pass valve toward closed position, closure means for said open end of said bore, a second relatively stronger co-axially disposed coil compression spring embracing said first spring in radially spaced relation thereto, one terminal engaging said closure means and the other terminal engaging said partition urging said relief valve in the direction of said first-named seat, whereby the introduction of a selected value of pressure through said first-named housing port becomes effective to move said pressure relief valve assembly away from said first-named seat as a unit and providing for the passage of fluid out through said second-named housing port and similarly the delivery of pressure through said second named port and into contact with the underside of said by-pass valve within said reduced tubular portion being effective to cause the opening of said by-pass valve against the action of said relatively light spring providing for flow in the reverse direction through said first-named housing port.

2. In a valve unit providing for flow in both directions therethrough in response to selected values of pressure acting thereon in the respective directions, including: means defining a valve housing having a stepped cylindrical bore therein, said bore comprising a first inner reduced portion joining with an enlarged cylindrical portion terminating in an open end, said two bores having therebetween a valve seat facing in the direction of said open end, a first port in the wall of said housing communicating with said reduced bore on the inner side of said valve seat and a second port in the wall of said housing communicating with said enlarged bore on the opposite side of said valve seat intermediate the ends of said enlarged bore, means defining a pressure relief and by-pass valve assembly proper reciprocable within said enlarged bore through the open end thereof and including a tubular member, said tubular member having an enlarged piston-like skirt cooperating with said enlarged bore and a reduced tubular portion terminating in a generally conical shaped valve engageable with said valve seat, radial port means in the wall of said reduced tubular portion placing said second-named housing port in communication with the interior of said tubular member, a second valve seat formed in the inner terminal of said reduced tubular portion and facing in the direction opposite to that in which said first-named valve seat faces, a disc-like by-pass valve engageable with said second-named valve seat, a valve stem extending from the back side of said second valve, a transverse partition within said tubular member formed with a cylindrical bore, said valve stem passing through said cylindrical bore, said arrangement being particularly characterized by the provision of a first relatively light coil compression spring interposed about said stem between said partition and the terminal of said stem functioning to normally urge said by-pass valve into engagement with said second-named valve seat, and means for closing the outer terminal of said enlarged bore, a second relatively strong coil compression spring embracing said first-named coil compression spring in radially spaced relation thereto and having one terminal thereof engaging said closure means and the other terminal engaging said partition for normally urging said pressure relief valve into engagement with said first-named seat whereby to remove both of said coil compression springs out of the path of flow in either direction through said valve unit and to incorporate a dash-pot action in the operation of said pressure relief valve.

JAMES A. COMPTON.
NORBERT W. HORN.